United States Patent
Cherkauer

(10) Patent No.: US 7,483,911 B2
(45) Date of Patent: Jan. 27, 2009

(54) SENDING LOG RECORDS DIRECTLY FROM LOG BUFFER

(75) Inventor: Kevin J. Cherkauer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/930,556

(22) Filed: Aug. 31, 2004

(65) Prior Publication Data

US 2006/0047684 A1    Mar. 2, 2006

(51) Int. Cl.
G06F 7/00 (2006.01)
G06F 17/00 (2006.01)

(52) U.S. Cl. .................. 707/102; 707/101; 707/103 R; 707/103 Y; 707/103 X; 707/103 Z

(58) Field of Classification Search ........................ None
See application file for complete search history.

(56) References Cited

U.S. PATENT DOCUMENTS

| | | | | |
|---|---|---|---|---|
| 5,594,900 | A * | 1/1997 | Cohn et al. ................. | 707/202 |
| 6,092,085 | A * | 7/2000 | Keene ........................ | 707/202 |
| 6,202,071 | B1 * | 3/2001 | Keene ........................ | 707/202 |
| 7,200,588 | B1 * | 4/2007 | Srivastava et al. ............. | 707/3 |
| 2001/0047360 | A1 * | 11/2001 | Huras et al. ................. | 707/102 |
| 2002/0103816 | A1 * | 8/2002 | Ganesh et al. ............... | 707/204 |
| 2003/0061537 | A1 * | 3/2003 | Cha et al. .................... | 714/16 |
| 2004/0098425 | A1 * | 5/2004 | Wiss et al. .................. | 707/204 |

OTHER PUBLICATIONS

Doug Stacy, "Replication: DB2, Oracle, or Sybase?", SIGMOD Record, vol. 24, Dec. 1995, pp.*
Doug Stacy, "Replication: DB2, Oracle, or Sybase?", SIGMOD Record, vol. 24, Dec. 1995, pp. 95-101.*
Sreenivas Gukal et al., Transient versioning for consistency and concurrency in client-server systems, Proceedings of the fourth international conference on on Parallel and distributed information systems, Miami Beach, Florida, 1996, pp. 274-285.
Michael J. Franklin et al., Transactional client-server cache consistency: alternatives and performance, ACM Transactions on Database Systems, vol. 22, No. 3, Sep. 1997, pp. 315-363.

(Continued)

Primary Examiner—Jean B. Fleurantin
Assistant Examiner—Hares Jami
(74) Attorney, Agent, or Firm—Steven Lieske Bennett

(57) ABSTRACT

Sending log records from a first system instance's log buffer to a second system instance is disclosed. Both instances may be instances of a database system. A method may create a log record within the buffer. The record contains actual log information, such as descriptions of transactions. A flag corresponding to the record is set in memory other than the buffer. The flag indicates whether the record has been sent to the second instance, and/or whether the second instance has received the record. The method may further embed non-log information within a simulated log record having a format identical to the log record's format. The non-log information, which may not include actual transactions to be committed, is embedded in a body section of the simulated record. At least one otherwise unused bit of a metadata section of the simulated record is set, indicating that the simulated record is simulated.

14 Claims, 6 Drawing Sheets

OTHER PUBLICATIONS

Lei Gao et al., Application specific data replication for edge services, Proceedings of the WWW, Budapest, Hungary, May 20-24, 2003, pp. 449-460.

M. Satyanarayanan, The evolution of Coda, ACM Transactions on Computer Systems, vol. 20, No. 2, May 2002, pp. 85-124.

Mark Nicolett et al., Tutorial: The how to's of disaster recovery planning, Gartner Symposium ITXpo, Oct. 6-11, 2002, Wall Disney World, Orland, Floria.

Doug Stacey, Replication: DB2, Oracle, or Sybase?, SIGMOD Record, vol. 24, No. 4, Dec. 1995, pp. 95-101.

* cited by examiner

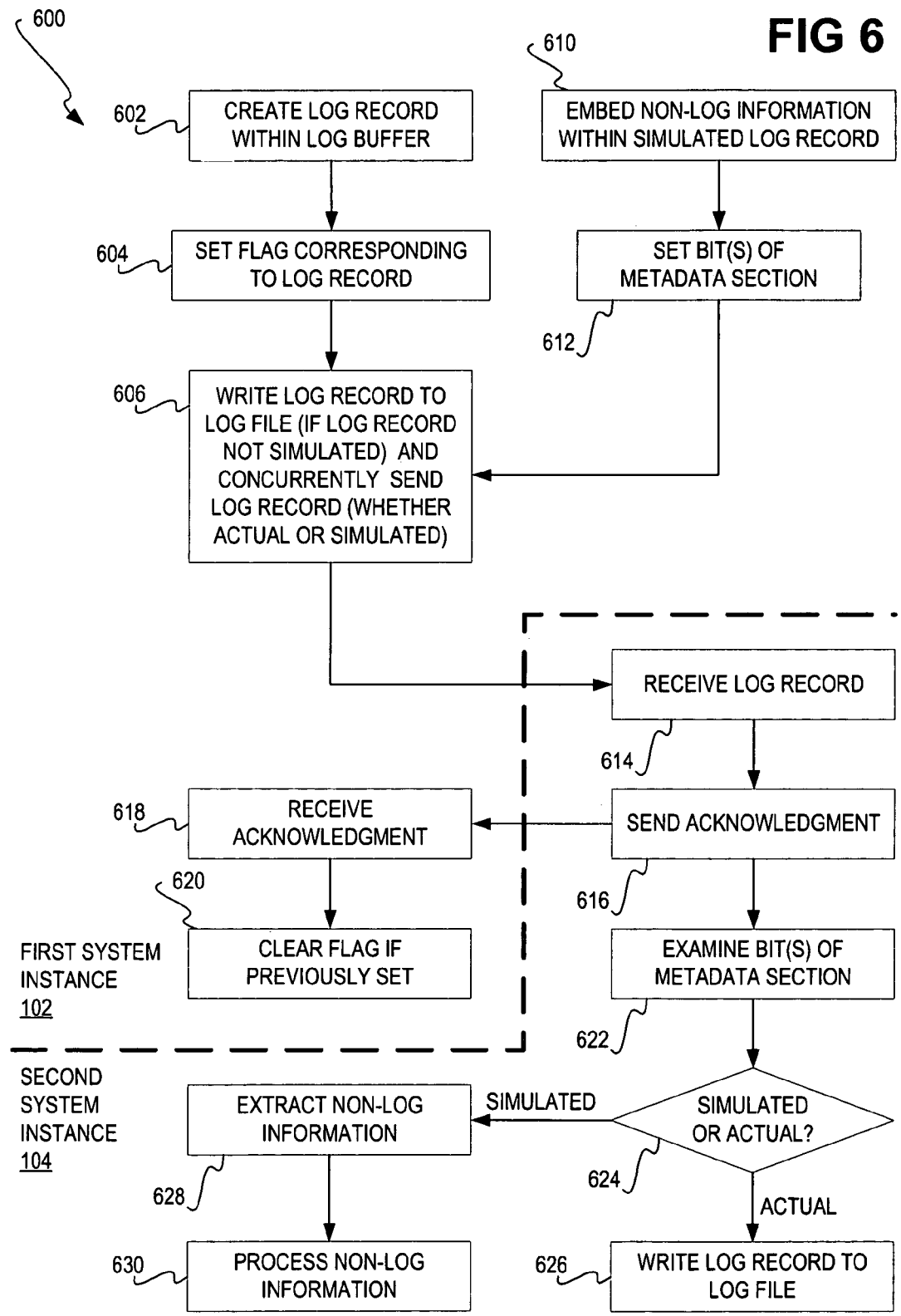

ic applications. For example, the database system must usu-
SENDING LOG RECORDS DIRECTLY FROM LOG BUFFER

FIELD OF THE INVENTION

The present invention relates generally to sending log records from a first system instance to a second system instance, and more particularly to sending such log records directly from a log buffer of the first system instance to the second system instance. For example, the log records can be sent to the second system instance without making copies of the log records at the first system instance.

BACKGROUND OF THE INVENTION

Database systems are a common form of computer system that have a wide variety of applications. A database system may be generally defined as a computer system that creates and/or manages a set of related files, or records, which are collectively referred to as the database. Financial records, health records, and other types of records are examples of the type of data that may be created by and stored within database systems.

A database system is usually typified by transactions, such as read and write transactions. In response to receiving a read transaction, the database system reads and returns a particular record or records. In response to receiving a write transaction, the database system may create a new record or records, modify an existing record or records, or, in some types of database systems, delete an existing record or records. In some database systems, write transactions may thus be specifically divided into create transactions, modify transactions, and delete transactions.

In general, maintaining the integrity of the databases in database systems is important, specially for the mission-critical applications. For example, the database system must usually guarantee that transactions are processed in order, such as in the temporal order in which they are generated, or in the temporal order in which the database system receives the transactions. Furthermore, the database system must usually guarantee that transactions are processed, or committed, atomically, such that either the entire transaction is processed, or none of the transaction is processed.

Finally, the database system must typically guarantee that, should some type of failure occur within the system, the database can be recovered so that it reflects the transactions that have previously been committed to the database. One way of achieving this latter guarantee is to write information about the write transactions to a log file. If the database system fails, an older copy of the database can then be updated by the transactions of the log file that are newer than this copy of the database.

However, updating an older copy of the database with the newer transactions stored in a log file can take time. The database system may be down for maintenance while the newer transactions are committed to the older copy of the database. During this time, new write transactions may not be able to be committed to the database, and read transactions may not be able to be processed, such that users are not able to retrieve information stored within the database. For mission-critical and other types of applications, this kind of downtime may be unacceptable.

Therefore, a second instance of a database system may be online at all times. The primary instance of the database system receives transactions, and in addition to committing them to its copy of the database, sends copies of the transactions to the second instance of the database system. The second instance of the database system commits these received transactions to its copy of the database. Therefore, at any given time, two current copies of the database are in existence. Should the first instance of the database system fail, the second instance of the database system can take over as the new primary instance until the first instance recovers.

Database systems achieve such two-instance redundancy usually by shipping, or sending, log records from the first instance of the database system to the second instance of the database system. The log records collectively contain information specifying how to perform and commit the same transactions to the second database, where multiple log records may be needed to describe a single transaction. Failover from the first database instance to the second database instance in case of failure of the former database instance can occur quite rapidly, in near real-time.

Prior art database systems usually send log records from a first instance of a database system to a second instance of the database system in one of two ways. First, and most commonly, the first instance of the database system writes the log records to a log file, which is typically stored on a hard disk drive, then reads these records back from the log file to send them to the second instance of the database system. Transactions within the log records are not actually committed by the first instance until they are at least sent to the second instance, so that the database copies maintained by the first and second instances are in-sync with one another. As such, the first instance of the database system suffers a large performance penalty in sending log records to the second instance of the database system: the latency incurred in having to write the log records to the log file and read them back from the log file before committing their transactions to the database can be substantial.

To overcome this performance penalty, some prior art database systems employ a second approach to send log records from a first instance of a database system to a second instance of the database system. The first instance of the database system, rather than writing the log records to a log file before sending the log records to the second instance of the database system, instead makes, in memory, what are referred to as staging copies of the log records before sending the log records to the second instance and committing their transactions. The staging copies may include whatever additional information the second instance needs to properly ensure that its database is in-sync with the first instance's database.

While the performance penalty the first instance of the database system suffers by using this alternative approach to send log files to the second instance of the database system is reduced by not having to write and read back the log records to the log file before committing transactions, it can still remain significant. The latency incurred in having to make copies of the log records within memory, and the added workload on the first instance's processor, can cause performance degradation. For this and other reasons, therefore, there is a need for the present invention.

SUMMARY OF THE INVENTION

The present invention relates to sending log records directly from a log buffer of a first system instance to a second system instance. In a method of an embodiment of the invention, a log record is created within a log buffer used to image the log record prior to writing the log record to a log file of a first system instance. The log record contains actual log information. The first system instance is a hardware and software instance of a system. The log buffer is hardware memory. A flag is set in memory other than the log buffer and corresponds to the log record. The flag indicates whether the log record has been sent to a second system instance, and/or whether the log record has been received by the second system instance. The second system instance is also a hardware and software instance of the system. The log record is sent over a network from the first system instance to the second system instance. Non-log information is embedded within a simulated log record that has a format identical to a format of the log record and that has at least body and header and footer metadata sections. The non-log information is embedded in the body section of the simulated log record. At least one otherwise unused bit of the metadata section of the simulated log record is set to indicate that the simulated log record is simulated and does not contain actual log information. The simulated log record is sent over the network from the first system instance to the second system instance. The simulated log record has the same length as the log record.

Embodiments of the invention provide for advantages over the prior art. In particular, a first system instance of a database system incurs a minimal performance penalty in having to send log records to a second system instance of the database system. The first system instance sends the log records directly from its log buffer to the second system instance without first storing or reading back the log records to a storage device, like a hard disk drive, and without first copying the log records within memory to make staging copies of the log records. So that the first system instance can determine which parts of the log buffer can be reused to store new log records, the first system instance sets a flag in memory other than the log buffer corresponding to a log record that has been created within the log buffer. Once the flag is cleared, the first system instance can then reuse the portion of the log buffer in which the log record was stored to store a new log record.

Furthermore, embodiments of the invention provide for sending non-log information from the first system instance of the database system to the second system instance of the database system that may be needed to ensure that the latter instance's database is in-sync with the former instance's database. In particular, the first system instance creates simulated log records that contain non-log information, such as log file identifiers and log file sizes, and other information that is not contained within actual log information. The simulated log records have the same format as the actual log records, and one or more otherwise unused bits of the log records are used in the simulated log records to indicate their simulated nature. As such, the second system instance receives records that are of the same format, and inspects bits of each received record to determine whether the record is an actual log record or a simulated log record.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a flowchart of a method for sending log records directly from a log buffer of a first system instance to a second system instance, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
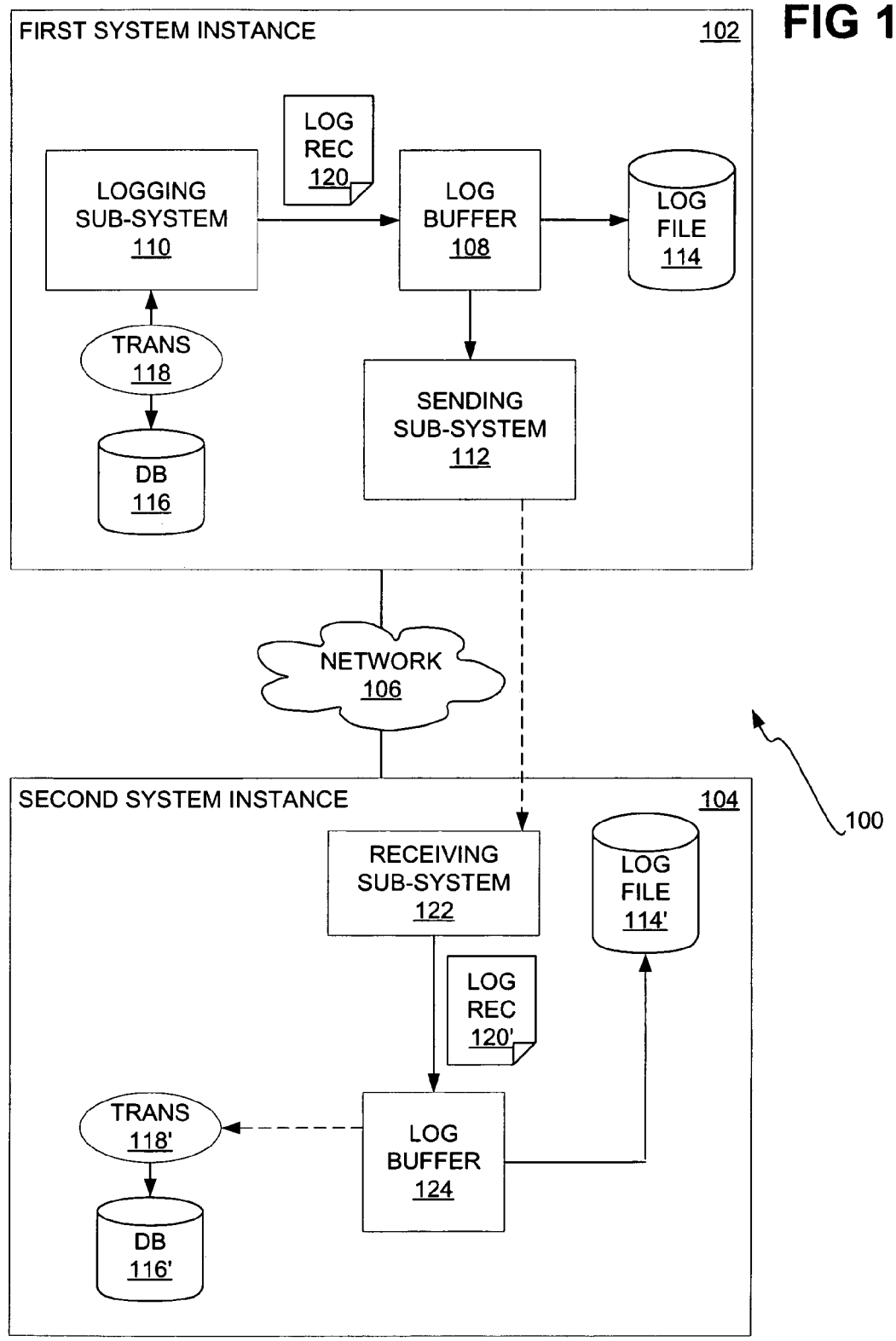
FIG. 1 is a diagram of a system in which a first system instance sends log records directly from a log buffer to a second system instance, according to an embodiment of the invention, and is suggested for printing on the first page of the patent.

FIG. 1 shows a system 100 having a first system instance 102 and a second system instance 104, according to an embodiment of the invention. Each of the system instances 102 and 104 as depicted in FIG. 1 is a different software and hardware instance of a database system. That is, both the system instances 102 and 104 include software and hardware that implement substantially the same database functionality. In other embodiments, the system instances 102 and 104 may be different software-only instances of a database system. The system instances 102 and 104 are depicted in FIG. 1 as being communicatively connected by a network 106. As such, the system instances 102 and 104 may be implemented on different computing devices, such as different server computers. In other embodiments, the system instances 102 and 104 may be implemented on the same computing device, such as within different partitions of the same computing device. The network 106 may be or include one or more of a local-area network (LAN), a wide-area network (WAN), a storage-area network (SAN), an intranet, an extranet, the Internet, a wired and/or wireless network, as well as other types of networks. Furthermore, the system instances 102 and 104 may be instances of a system other than a database system, where such a system utilizes database software or database-like software that has database capabilities.

The first system instance 102 includes a log buffer 108, a logging sub-system 110, a sending sub-system 112, a log file 114, and a database 116. The first system instance 102 may also include other components in addition to and/or in lieu of those depicted in FIG. 1. The log buffer 108 is memory, such as volatile semiconductor memory like dynamic random access memory (DRAM), in which the logging sub-system 110 images log records, like the log record 120, before storing the log records to the log file 114. That is, the log buffer 108 is memory within which the logging sub-system 110 creates log records prior to writing the log records to the log file 114. The logging sub-system 110 may include hardware, software, or a combination of hardware and software.

The logging sub-system 110 creates log records, such as the log record 120, from transactions, such as the transaction 118 that the first system instance 102 receives. The transactions themselves may be delete transactions, write transactions, modify transactions, as well as other types of transactions, each of which specifies an operation to be performed relative to the database 116. The database 116 is stored in non-volatile memory, such as magnetic media like hard disk drives. Delete transactions may include instructions to delete a particular data record from the database 116, whereas write transactions may include instructions to write information to a new or existing data record within the database 116. Modify transactions may be considered a particular type of write transactions in which information within existing data records of the database 116 is modified.

Therefore, once the transaction 118 has been received by the first system instance 102, the logging sub-system 110 creates the log record 120 within the log buffer 108. The log record 120 contains actual log information in that the log record 120 includes data regarding details of the transaction 118, so that the transaction 118 can be reproduced should the database 116 and/or the first system instance 102 fail at a later point in time, such that the database 116 needs to be recreated. Once the logging sub-system 110 has created, or imaged, the log record 120 within the log buffer 108, it then stores the log record 120 within the log file 114. The log file 114 is typically stored in non-volatile memory, such as magnetic media like hard disk drives.

Once log records, such as the log record 120, have been created within the log buffer 108, the sending sub-system 112 sends the log records directly from the log buffer 108, through the network 106 in one embodiment, to the second system instance 104. The sending sub-system 112 may be or include hardware, software, or a combination of hardware and software. The sending sub-system 112 sends the log records directly from the log buffer 108 to the second system instance 104 in that no copies of the log records are made in other memory of the first system instance 102.

In particular, no staging copies of the log records are made in other memory of the first system instance 102. Staging copies of the log records would recreate or copy the log records in memory of the first system instance 102 other than the log buffer 108. Staging copies allow the logging sub-system 110 and the sending sub-system 112 to not have to cooperate to ensure that the logging sub-system 110 does not reuse portions of the log buffer 108 for new log records before the sending sub-system 112 has an opportunity to send the log records to the second system instance 104. The manner in which the sub-systems 110 and 112 cooperate so that staging copies are not needed is described in more detail later in the detailed description. Furthermore, it is noted that the sending sub-system 112 sends the log records directly from the log buffer 108, and not, for instance, by reading the log records from the log file 114 or another non-volatile memory or storage. It is noted that the transmission of the log records by the first system instance 102 to the second system instance 104 is one-direction process, in that the instance 102 always sends the log records to the instance 104, and the instance 104 always receives the log records from the instance 102. That is, the instance 104 does not send log records to the instance 102, and the instance 102 does not receive log records from the instance 104.

The second system instance 104 includes a receiving sub-system 122, a log buffer 124, as well as a log file 114' and a database 116'. The log file 114' and the database 116' of the second system instance 104 correspond to the log file 114 and the database 116 of the first system instance 102. The receiving sub-system 122 of the second system instance 104 receives log records, such as the log record 120, sent by the first system instance 102. In the embodiment of FIG. 1, the receiving sub-system 122 saves the log records to the log file 114'. At any particular point in time, the log file 114' is substantially identical to the log file 114, in that the log file 114 may be slightly more current than the log file 114' due to log records within the log buffer 108 not having been received yet by the receiving sub-system 122. The receiving sub-system 122 may be implemented in hardware, software, or a combination of hardware and software. The log buffer 124 may be volatile semiconductor memory, such as DRAM. The log file 114', as well as the database 116', may be stored on non-volatile memory, such as magnetic media like hard disk drives.

With respect to the log record 120 sent by the first system instance 102, the receiving sub-system 122 may image or create the log record 120' within the log buffer 124 of the second system instance 104. The log record 120' imaged within the log buffer 124 corresponds and is identical to the log record 120, but is denoted as different than the log record 120 in that the log record 120 exists within the first system instance 102, whereas the log record 120' exists within the second system instance 104. The transaction 118' may be created from the log record 120', where the transaction 118' corresponds and is identical to the transaction 118 in the same way that the log record 120' corresponds and is identical to the transaction 120. The transaction 118' may thus be applied to the database 116', so that the database 116' remains in-synch with and at least substantially identical to the database 116 to which it corresponds.

In summary, the first system instance 102 is the primary system instance of the system 100. Transactions, such as the transaction 118, are received by the first system instance 102 and applied to the database 118 of the first system instance 102. The logging sub-system 110 creates log records, such as the log record 120, within the log buffer 108, and writes the log records to the log file 114. The sending sub-system 112 sends the log records directly from the log buffer 108, through the network 106, and to the receiving sub-system 122. The receiving sub-system 122 writes the log records, such as the log record 120', to the log file 114'. The receiving sub-system 122 may also copy the log records to the log buffer 124. Transactions, such as the transaction 118', may be extracted from the log records of the log buffer 124 to apply against the database 116'.

It is noted that although transactions may be applied to the database 116 before their corresponding log records are sent by the sending sub-system 112 or received by the receiving sub-system 122, the transactions are not actually committed until either the log records are sent by the sending sub-system 112, received by the receiving sub-system 122, or both. That is, transactions are not considered to have been completely processed and applied to the database 116 until the sending sub-system 112 has sent their corresponding log records to the receiving sub-system 122 and/or the receiving sub-system 122 has received these log records from the sending sub-system 112. This helps to ensure that transactions are not committed to the database 116 unless corresponding transactions can also be committed to the database 116'.

Furthermore, in differing embodiments of the invention, transactions may not be committed until one of three options occurs. In one embodiment, a transaction is not committed until the second system instance 104 has received the corresponding log record or records and has written them to the log file 114'. In another embodiment, a transaction is not committed until the second system instance 104 has simply received the corresponding log record or records, regardless of whether it has written them to the log file 114'. In a third embodiment, a transaction is not committed until the first system instance 102 has just sent the corresponding log record or records.

Figure 2:
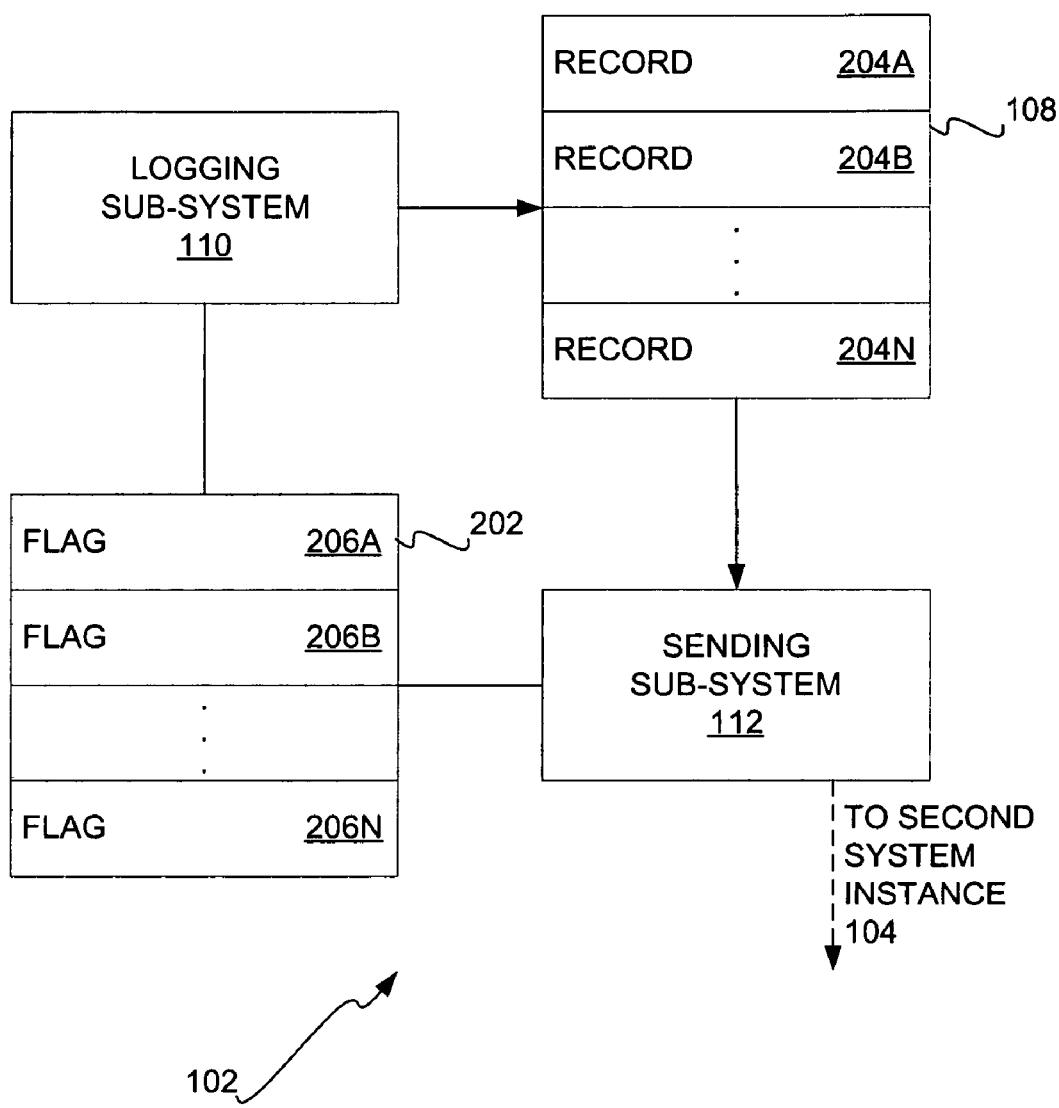
FIG. 2 is a diagram of the first system instance of FIG. 1 in more detail, according to an embodiment of the invention.

FIG. 2 shows the first system instance 102 in more detail, indicating the manner by which the logging sub-system 110 and the sending sub-system 112 cooperate so that the logging sub-system 110 does not reuse portions of the log buffer 108 until the sending sub-system 112 indicates it can, according to an embodiment of the invention. The log file 114 and the database 116 are not depicted in FIG. 2 for illustrative clarity and convenience. The first system instance 102 is specifically depicted in FIG. 2 as further including a memory 202. The memory 202 is preferably different than and/or separate from the memory in which the log buffer 108 is stored. The memory 202 is volatile memory, such as volatile semiconductor memory like DRAM.

The log buffer 108 is depicted as being able to store log records 204A, 204B, . . . , 204N, collectively referred to as the log records 204. The logging sub-system 110 creates or images the log records 204 within the log buffer 108, and the sending sub-system 112 sends the log records 204 directly from the log buffer 108 to the second system instance 104, as has been described. Furthermore, the memory 202 includes flags 206A, 206B, 206N, collectively referred to as the flags 206, and which correspond to the log records 204. Each of the flags 206 may be one or more bits in length. The flags 206 indicate whether their corresponding log records 204 have been sent to the second system instance 104 by the sending sub-system 112, and/or whether the second system instance 104 has received the log records 204.

The manner by which the logging sub-system 110 and the sending sub-system 112 cooperate so that the logging sub-system 110 does not reuse portions of the log buffer 108 until the sending sub-system 112 indicates it can is exemplarily described in relation to the log record 204A and its corresponding flag 206A. However, operation as to other of the log records 204 and other of the flags 206 is identical. When the logging sub-system 110 creates the log record 204A within the log buffer 108, it sets the corresponding flag 206A within the memory 202. For example, the logging sub-system 110 may set one or more bits of the flag 206A to logical zero or logical one.

In one embodiment, when the sending sub-system 112 sends the log record 204A directly from the log buffer 108 to the second system instance 104, it clears the flag 206A, such as by setting one or more bits of the flag 206A to logical one or logical zero. By clearing the flag 206A in this embodiment, the sending sub-system 112 indicates to the logging sub-system 110 that it can now reuse the portion of the log buffer 108 used to store the log record 204A to instead store a new log record. Until the sending sub-system 112 has cleared the flag 206A, the logging sub-system 110 is not permitted to reuse the portion of the log buffer 108 used to store the log record 204A.

In another embodiment, the sending sub-system 112 does not clear the flag 206A when sending the log record 204A directly from the log buffer 108 to the second system instance 104. Rather, the sending sub-system 112 waits for the second system instance 164 to send an acknowledgment back to the sending sub-system 112 indicating that the second system instance 104 has received the log record 204A, or alternatively, has received and written it to disk. Once the sending sub-system 112 receives the acknowledgment, the sending sub-system 112 clears the flag 206A. As such, the logging sub-system 110 is not permitted in this embodiment to reuse the portion of the log buffer 108 used to store the log record 204A until the sending sub-system 112 has received acknowledgment from the second system instance 104 and has cleared the flag 206A.

In a third embodiment, the flag 206A has at least two bits, both of which are set by the logging sub-system 110 when creating the log record 204A within the log buffer 108. The sending sub-system 112 clears the first bit when sending the log record 204A directly from the log buffer 108 to the second system instance 104. The sending sub-system 112 clears the second bit when receiving acknowledgment from the second system instance 104 that the second system instance 104 has received the log record 204A. The logging sub-system 110 is not permitted in this embodiment to reuse the portion of the log buffer 108 used to store the log record 204A until the sending sub-system 12 has cleared both bits of the flag 206A.

Using at least two bits in the flag 206A enables system diagnostics to more easily be performed when the second system instance 104 is not receiving the log record 204A from the first system instance 102. By examining one of the bits of the flag 206A, it can be determined whether the first system instance 102 is not properly sending the log record 204A to the second system instance 104. By examining the other bit of the flag 206A, it can also be determined whether the first system instance 102 is not properly receiving acknowledgment back from the second system instance 104 that the second system 104 has received the log record 204A.

It is noted that the terms setting and clearing as employed in relation to the flags 206 are substantially interchangeable and used for descriptive convenience and differentiation. That is, the embodiment of FIG. 2 has been described such that the logging sub-system 110 sets the flags 206 and the sending sub-system 112 clears the flags 206. Such description is meant to convey that the logging sub-system 110 writes one type of value to the flags 206 and the sending sub-system 112 writes another type of value to the flags 206. However, the denotation that the logging sub-system 110 sets the flags 206 and that the sending sub-system 112 clears the flags 206 is arbitrary, and encompassed by the usage of these terms is that the logging sub-system 110 could just as easily have been said to clear the flags 206 and that the sending sub-system said to set the flags 206.

Figure 3:
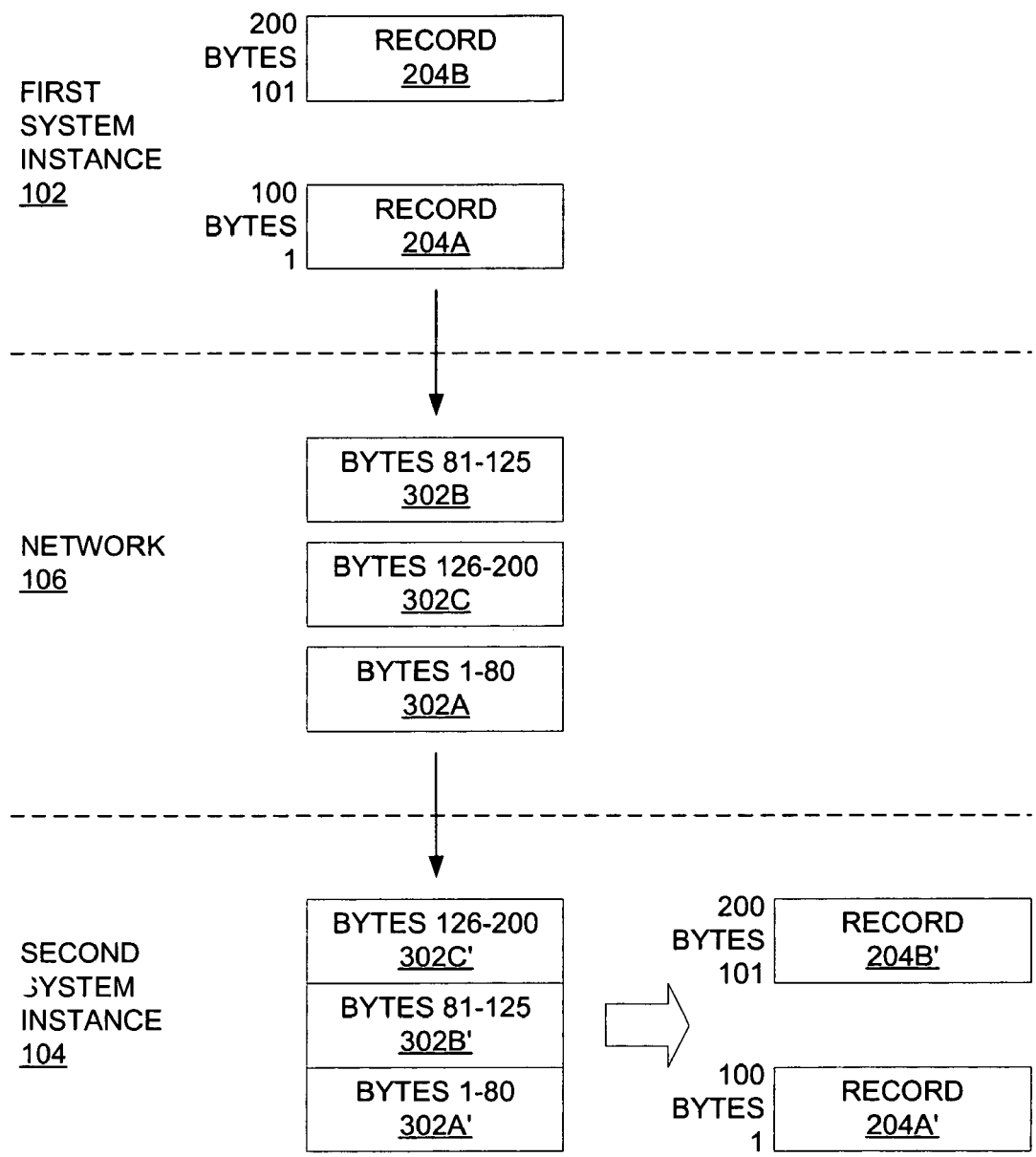
FIG. 3 is a diagram depicting the manner by which log records are sent from a first system instance to a second system instance over a packetized network, according to an embodiment of the invention.

FIG. 3 shows the manner by which log records 204A and 204B may be sent from the first system instance 102 to the second system instance 104 through the network 106, according to an embodiment of the invention. Each of the log records 204A and 204B for example purposes is considered to be 100 bytes in length. Where the log record 204A is sent first, and the log record 204B is sent second, the log record 204A includes bytes 1 through 100, whereas the log record 204B includes bytes 101 through 200.

The network 106 in the embodiment of FIG. 3 is a packetized network operating in accordance with a packetized protocol like Transmission Control Protocol/Internet Protocol (TCP/IP), or another packetized protocol. As such, the bytes of the log records 204A and 204B are divided into packets, such as the packets 302A, 302B, and 302C, collectively referred to as the packets 302, which are sent by the first system instance 102 and received by the second system instance 104 over the network 106. In the example of FIG. 3, the packet 302A contains bytes 1-80, and thus contains the first 80% of the record 204A. The packet 302B contains bytes 81-125, and thus contains the last 20% of the record 204A and the first 25% of the record 204B. The packet 302C contains bytes 126-200, and thus contains the last 75% of the record 204B.

Within a packetized network like the network 106 in the embodiment of FIG. 3, the packets 302 are not guaranteed to be received in order by the second system instance 104. For example, in FIG. 3 the packet 302A is indicated as being received first, the packet 302C is indicated as being received second, and the packet 302B is indicated as being received third. Once all of the packets 302 have been received by the second system instance 104, the second system instance 104 reorders the packets 302 in their proper order. For instance, as can be appreciated by those of ordinary skill within the art, packetized protocols, such as TCP/IP, generally do not guarantee the order in which packets are delivered, and thus the protocols automatically reorder received packets to ensure that they are reconstructed in the proper order. FIG. 3 thus depicts the packets 302A', 302B', and 302C' as being the properly ordered versions of the packets 302A, 302B, and 302C that the first system instance 102 sent over the network 106 to the second system instance 104. The packets 302A', 302B', and 302C' are collectively referred to as the packets 302'.

The second system instance 104 is configured so that it knows that each of the log records 204 sent by the first system instance 102 is 100 bytes in length, which is an arbitrary length employed in one embodiment of the invention, such that other lengths can be selected in other embodiments of the invention. Therefore, after ordering the packets 302 as the packets 302', the second system instance 104 can simply divide the 200 bytes contained in the packets 302' to extract the log records 204A and 204B as the log records 204A' and 204B'. The log records 204A' and 204B' are collectively referred to as the log records 204'.

Since the first system instance 102 directly sends the log records 204 from the log buffer 108 to the second system instance 104, in one embodiment the second system instance 104 is configured so that it knows the length of each of the log records 204, in order to be able to properly extract the log records 204' from the packets 302'. This is because the first system instance 102, such as the sending sub-system 112 thereof, is not able to include additional information along with the log records 204 when sending them directly from the log buffer 108. Rather, additional information can only be sent along with the log records 204 if a separate staging copy of the log records 204 were made by the sending sub-system 112 in which such information could be embedded, and such staging copies are not made within embodiments of the invention.

Therefore, additional information regarding the log records 204 or the transactions to which they relate cannot be added to the log records 204 themselves, without sending additional bytes to the second system instance 104, such that the second system instance 104 would not be able to discern which bytes belong to log records. That is, the second system instance 104 in the embodiment of FIG. 3 is configured to consider each consecutively ordered 100 bytes that are received as a separate log record. If additional bytes are added by the first system instance 102 in between log records, the second system instance 104 cannot properly demarcate the dividing line between log records, and between log records and other data, within the data of the packets that are received and reordered.

In another embodiment of the invention, the length of the log records is not used by the second system instance 104 to parse the incoming packets 302' received from the first system instance 102. In such an embodiment, the log records may not all have the same length. For instance, log records may be of variable length. In such an embodiment, the log records include delineation of their lengths, so that the second system instance 104 is able to parse the log records from the packets received from the first system instance 102.

Figure 4:
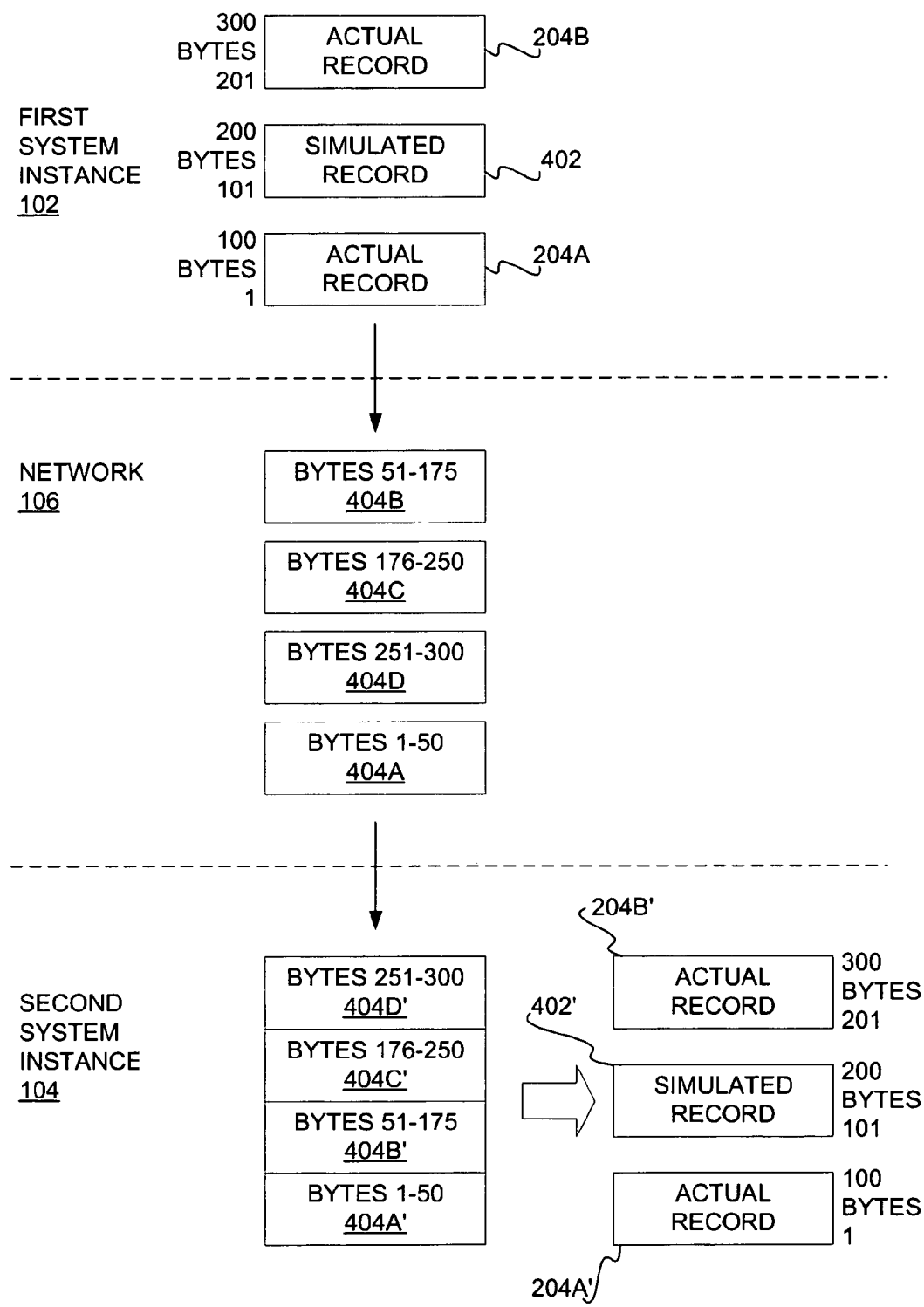
FIG. 4 is a diagram depicting the manner by which actual log records containing actual log information and simulated log records containing non-log information are sent from a first system instance to a second system instance over a packetized network, according to an embodiment of the invention.

FIG. 4 shows the manner by which simulated log records are sent from the first system instance 102 to the second system instance 104, by interleaving the simulated log records among the log records 204, according to an embodiment of the invention. In particular, the simulated log record 402 is depicted in FIG. 4 as being interleaved between the log record 204A and the log record 204B. The simulated log record 402 has the same length as the log records 204, which are referred to as the actual log records 204 in FIG. 4 because they contain log information relating to transactions. By comparison, the simulated log record 402 contains non-log information, such as metadata relating to the log records 204. For example, the non-log information may contain identifiers and other information regarding the log records 204, which is not contained within the log records 204 themselves. The use of simulated log records overcomes the difficulties with attempting to send additional information to the second system instance 104 in addition to the log records 204 that were described in relation to FIG. 3. Furthermore, the use of simulated log records overcomes the difficulty of having to send additional information such that it is received in a specific sequence with respect to the log records.

Each of the actual log records 204, and the simulated log record 402, is considered to be 100 bytes in length for example purposes. The actual log record 204A is sent first, and thus includes bytes 1 through 100. The simulated log record 402 is sent second, and thus includes bytes 101 through 200. The actual log record 204B is sent third, and thus includes bytes 201 through 300. The network 106 in the embodiment of FIG. 4 is again a packetized network operating in accordance with a packetized protocol like TCP/IP or another packetized protocol.

The bytes of the log records 204 and 402 are divided into packets, such as the packets 404A, 404B, 404C, and 404D, collectively referred to as the packets 404. The packets 404 are sent by the first system instance 102 and received by the second system instance 104 over the network 106. In FIG. 4, the packet 404A contains bytes 1-50, and thus 50% of the log record 204A, and the packet 404B contains bytes 51-175, and thus 50% of the log record 204A and 75% of the simulated log record 402. The packet 404C contains bytes 176-250, and thus 25% of the simulated log record 402 and 50% of the log record 204B. Finally, the packet 404D contains bytes 251-300, and thus 50% of the log record 204B.

The packets 404 are not guaranteed to be received in order by the second system instance 104. For example, in FIG. 4, the packet 404A is received first, the packet 404D is received second, the packet 404C is received third, and the packet 404B is received fourth. The second system instance 104 reorders the packets 404 in their proper order upon receipt. The packets 404A', 404B', 404C', and 404D' are the properly ordered versions of the packets 404A, 404B, 404C, and 404D. The packets 404A', 404B', 404C', and 404D' are collectively referred to as the packets 404'.

In this example, the second system instance 104 is configured so that it knows that the log records sent by the first system instance 143 are each 100 bytes in length. Therefore, after ordering the received packets 404 as the packets 404', the second system instance 104 divides the 300 bytes contained in the packets 404' to extract the log records 204A', 402', and 204B'. The log records 204A' and 204B' are collectively referred to as the log records 204'. Next, the second system instance 104 examines each of the log records received to determine if it is an actual log record, containing actual log information, or a simulated log record, containing non-log information. The manner by which such examination is accomplished is described later in the detailed description.

The utilization of simulated log records having the same length as actual log records enables the first system instance 102 to send non-log information along with the actual log records without having to make staging copies of the actual log records. The sending sub-system 112 in particular creates simulated log records, embedding non-log information therein, and sends the simulated log records by interleaving them among the actual log records 204. The receiving sub-system 122 of the second system instance 104 is still able to properly recognize log records by dividing data that has been received in 100-byte groups, where both simulated and actual log records are all 100-bytes in length. Each consecutively ordered 100-byte group of data that has been received thus corresponds to either a simulated log record or an actual log record. The receiving sub-system 122 only additionally has to examine the log records recognized to determine if they are actual log records or simulated log records.

Figure 5:
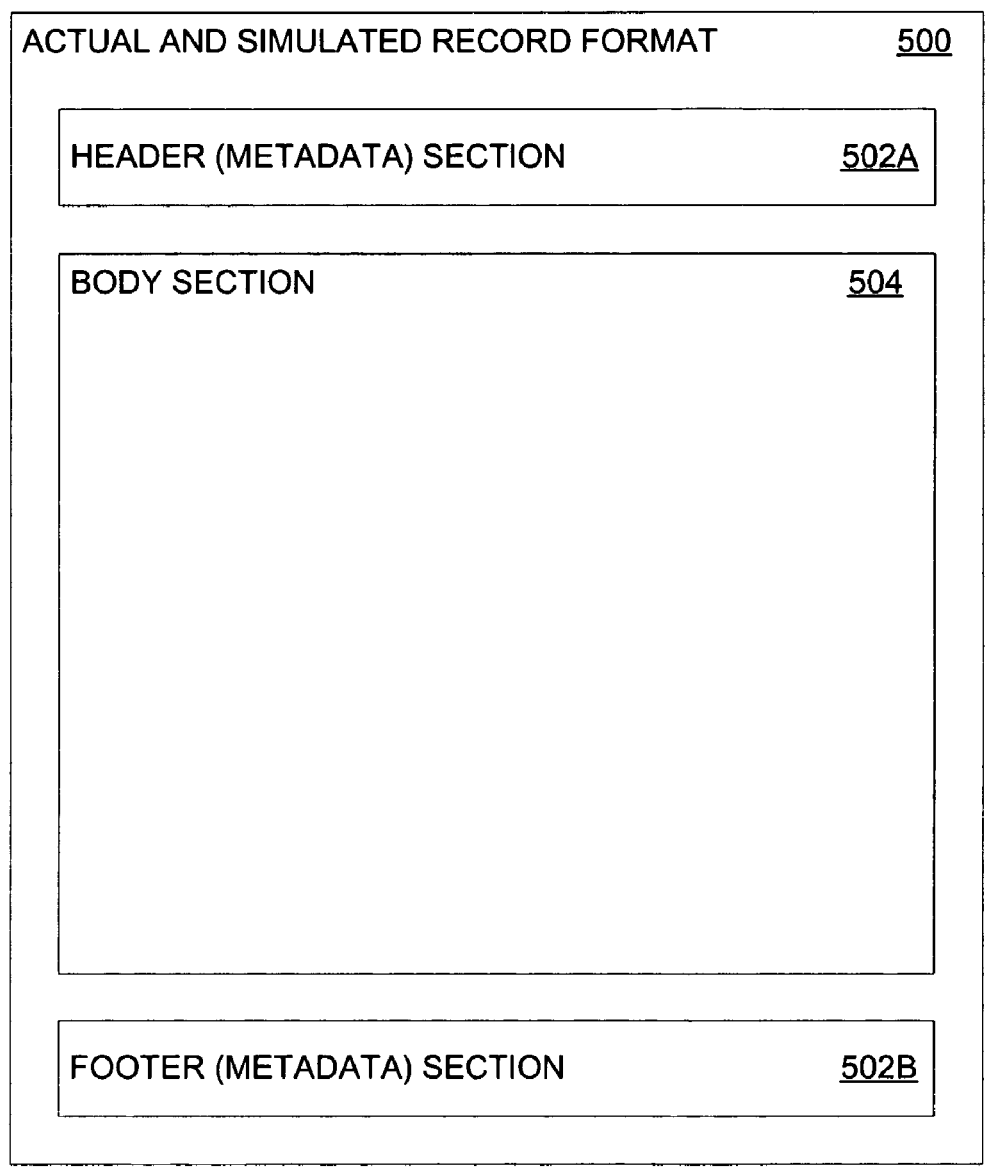
FIG. 5 is a diagram of the format of an actual log record and a simulated log record, according to an embodiment of the invention.

FIG. 5 shows the format 500 of actual and simulated log records, according to an embodiment of the invention. The actual and simulated log record format 500 includes a header metadata section 502A and a footer metadata section 502B, collectively referred to as the metadata sections 502, as well as a body section 504. The log record format 500 may include metadata sections in addition to and/or in lieu of the metadata section 502A or the metadata section 502B. For an actual log record, the actual transaction data of the actual log record is stored in the body section 504 of the log record format 500. Furthermore, for an actual log record, information related to the transaction data, but not the actual transaction data itself, is stored in the metadata sections 502. For example, information such as when the transaction was received and/or processed against the database 116 may be stored in the metadata sections 502. The metadata sections 502 are metadata in that they contain information regarding the transaction data, and not the actual transaction data itself. The metadata sections 502 may also contain data about the log record itself, such as it size and type, or consistency information such as parity or checksum values.

The log record format 500 is used for simulated log records sent from the first system instance 102 to the second system instance 104 as follows. The body section 504 contains the non-log information of the simulated log record. To indicate that the log record in question is a simulated log record containing non-log information and not an actual log record containing actual log information, one or more otherwise unused bits of either or both of the metadata section 502A and the metadata section 502B are set. That is, the metadata sections 502 contain one or more reserved bits that actual log records formatted in accordance with the log record format 500 do not use. The sending sub-system 112 uses these otherwise unused reserve bits, by setting them to logical one and/or logical zero, within a simulated log record in which non-log information has been embedded to indicate to the receiving sub-system 122 that the log record in question is indeed simulated and not an actual log record.

Therefore, when the receiving sub-system 122 extracts log records from the packets of data received over the network 106 from the first system instance 102 and reorders them, the receiving sub-system 122 examines these bits of the metadata sections 502 of the log records to determine whether the log records are actual log records or simulated log records. The second system instance 104, in other words, is able to distinguish simulated log records from actual log records by examining these bits. For example, if the bits have been set within a given log record, then the receiving sub-system 122 treats the log record as a simulated log record containing non-log information in the body section 504 thereof. By comparison, if the bits have not been set within a given log record, then the receiving sub-system 122 treats the log record as an actual log record containing actual log information regarding a transaction in the body section 504 thereof.

In embodiments where the log records do not all have the same length, metadata information within one of the metadata sections 502 of a log record may contain information as to the length of a particular log record. Both actual log records and simulated log records thus include length information thereof in one of their metadata sections 502. The second system instance 104 therefore uses the metadata length information to determine how to demarcate multiple received log records.

FIG. 6 shows a method 600 for sending both actual and simulated log records from the first system instance 102 to the second system instance 104, according to an embodiment of the invention. The method 600 may be partially or completely implemented as a computer program stored on a computer-readable medium. The computer-readable medium may be a recordable data storage medium, a modulated carrier signal, or another type of computer-readable medium. As depicted in FIG. 6, parts of the method 600 are performed by the first system instance 102, whereas other parts of the method 600 are performed by the second system instance 104.

For an actual log record to be sent to the second system instance 104, the logging sub-system 110 of the first system instance 102 creates or images the log record within the log buffer 108 (602). The logging sub-system 110 sets a flag within the memory 202 that corresponds to the log record (604). The logging sub-system 110 then writes this actual log record to the log file 114, while the sending sub-system 112 of the first system instance 102 concurrently directly sends the actual log record from the log buffer 108 to the second system instance 104 (606). By comparison, for a simulated log record to be sent to the second system instance 104, the sending sub-system 112 embeds non-log information within the body section 504 of the simulated log record (610). The sending sub-system 112 also sets one or more bits of the metadata sections 502 of the simulated log record (612). Finally, the sending sub-system 112 sends the simulated log record to the second system instance 104 (606).

The receiving sub-system 122 of the second system instance 104 receives the log record sent by the sending sub-system 112 of the first system instance 102 (614). In response, the receiving sub-system 122 sends an acknowledgment back to the first system instance 102 that it has received the log record sent (616). The sending sub-system 112 of the first system instance 102 receives the acknowledgement (618). In response, the sending sub-system 112 clears the flag that was previously set in 604 by the logging sub-system 110 if the acknowledgment relates to an actual log record (620). If the acknowledgement relates to a simulated log record, however, then there is no flag for the sending sub-system 112 to clear. Furthermore, in another embodiment, the second system instance 104 may not send an acknowledgment. Therefore, the sending sub-system 112 instead clears the flag in 620, if needed, after sending the log record in 606.

After the receiving sub-system 122 of the second system instance 104 has received the log record in 614 and optionally has sent an acknowledgment in 616, it examines the bits of the metadata sections 502 of the log record that has been received to determine whether log record is an actual log record or a simulated log record (624). If the log record is an actual log record, then the receiving sub-system 122 writes the log record to the log file 114' of the second system instance 104 (626). However, if the log record is a simulated log record, then the receiving sub-system 122 extracts the non-log information (628), which is processed as appropriate (630).

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. For instance, whereas embodiments of the invention have substantially been described in relation to first and second system instances of a database system, in other embodiments of the invention, the first and second system instances may be instances of a system other than a database. It is thus manifestly intended that this invention be limited only by the claims and equivalents.

I claim:

1. A computer-implemented method comprising:
   creating a log record within a log buffer used to image the log record prior to writing the log record to a log file of a first system instance, the log record containing actual log information, the first system instance being a hardware and software instance of a system, the log buffer being hardware memory;
   setting a flag in memory other than the log buffer and corresponding to the log record, the flag indicating at least one of whether the log record has been sent to a second system instance and whether the log record has been received by the second system instance, the second system instance also being a hardware and software instance of the system;
   sending the log record over a network from the first system instance to the second system instance;
   embedding non-log information within a simulated log record having a format identical to a format of the log record and having at least body and header and footer metadata sections, the non-logic information embedded in the body section of the simulated log record;
   setting at least one otherwise unused bit of the metadata section of the simulated log record to indicate that the simulated log record is simulated and does not contain actual log information; and,
   sending the simulated log record over the network from the first system instance to the second system instance,
   wherein the simulated log record has a same length as the log record.

2. The computer-implemented method of claim 1, further comprising writing the log record to the log file of the first system instance.

3. The computer-implemented method of claim 2, further comprising:
   receiving the log record by the second system instance; and,
   writing the log record to a log file of the second system instance.

4. The computer-implemented method of claim 1, further comprising clearing the flag in the memory to indicate that the log record has been sent to the second system instance, so that a portion of the log buffer used to store the log record can be reused.

5. The computer-implemented method of claim 1, further comprising, in response to receiving indication from the second system instance that the second system instance has received the log record, clearing the flag in the memory, so that a portion of the log buffer used to store the log record can be reused.

6. The computer-implemented method of claim 1, further comprising:
   receiving the simulated log record by the second system instance;
   examining the at least one otherwise unused bit of the metadata section of the simulated log record to determine whether the simulated log record is simulated or contains actual log information; and,
   upon determining that the simulated log record is simulated,
      extracting the non-log information from the body section of the simulated log record; and,
      processing the non-log information.

7. The computer-implemented method of claim 1, further comprising:
   receiving the log record by the second system instance;
   examining the at least one otherwise unused bit of the metadata section of the metadata section of the log record to determine whether the log record is simulated or contains actual log information; and,
   upon determining that the log record contains actual log information, writing the actual log information thereof to a log file of the second system instance.

8. The computer-implementing method of claim 1, wherein the first system instance and the second system instances are instances of a database system.

9. A system comprising:
   a first system instance comprising:
      a processor;
      a log buffer that is hardware memory;
      a logging sub-system implemented by the processor to create log records within the log buffer, the log records containing actual log information;
      a memory having flags corresponding to the log records created within the log buffer, the flags indicating at least one of whether the log records have been sent and whether the log records have been received;
      a sending sub-system to send the log records directly from the log buffer without making staging copies of the log records; and,
   a second system instance comprising a receiving sub-system to receive the log records from the first system instance.
   wherein the first system instance and the second system instance are each a hardware and software instance of a database system, and
   wherein the sending sub-system is further to embed non-log information within body sections of simulated log records, the simulated log records also having header and footer metadata sections, and to send the simulated log records interleaved among the log records to the second instance,
   wherein the sending sub-system is further to set at least one otherwise unused bit of the header and footer metadata sections of each simulated log record to indicate that the simulated log record is simulated and does not contain actual log information, and
wherein the simulated log record has a same length as the log record.

10. The system of claim 9, wherein the first system instance further comprises a log file and a writing sub-system to write the log records from the log buffer to the log file.

11. The system of claim 9, wherein the logging sub-system sets the flags upon creating the log records within the log buffer.

12. The system of claim 11, wherein the sending sub-system clears the flags upon sending the log records to the second system instance, such that the logging sub-system is able to reuse portions of the log buffer used to store the log records upon the flags having been cleared.

13. The system of claim 11, wherein the receiving sub-system sends acknowledgments back to the first system instance upon receiving the log records, and the sending sub-system clears the flags upon receiving the acknowledgments back from the second system instance, such that the logging sub-system is able to reuse portions of the log buffer used to stored the log records upon the flags having been cleared.

14. The system of claim 9, wherein the receiving sub-system is further to receive the simulated log records along with the log records from the first system instance, and to examine each record of the simulated log records and the log records to determine whether the record is a simulated log record containing non-log information or whether the record is a log record containing actual log information.

* * * * *